(12) United States Patent
Iijima et al.

(10) Patent No.: US 6,649,291 B1
(45) Date of Patent: Nov. 18, 2003

(54) METHOD FOR DRIVING A FUEL CELL VEHICLE AND FUEL CELL VEHICLE

(75) Inventors: Masaki Iijima, Tokyo (JP); Kazuto Kobayashi, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/606,753

(22) Filed: Jun. 29, 2000

(30) Foreign Application Priority Data

Jun. 30, 1999 (JP) .......................... 11/185191

(51) Int. Cl.[7] .................. H01M 8/06; H01M 8/04; B60L 11/18
(52) U.S. Cl. .................. 429/17; 429/19; 429/20; 180/65.3
(58) Field of Search .................. 429/17, 19, 20; 180/65.1, 65.3

(56) References Cited

U.S. PATENT DOCUMENTS

| 4,925,748 A | 5/1990 | Ikoma et al. |
| 5,290,509 A | 3/1994 | Furukawa et al. |
| 5,658,681 A | 8/1997 | Sato et al. |
| 5,678,410 A | * 10/1997 | Fujita et al. ............ 165/104.12 |
| 5,741,474 A | * 4/1998 | Isomura et al. .............. 422/198 |
| 5,782,960 A | 7/1998 | Ogawa et al. |
| 5,797,269 A | 8/1998 | Nishimura et al. |
| 5,879,831 A | 3/1999 | Ovshinsky et al. |
| 5,997,594 A | 12/1999 | Edlund et al. |

FOREIGN PATENT DOCUMENTS

| JP | 8-301601 | * 11/1996 |
| JP | 09-002801 | * 1/1997 |
| JP | 2000-067898 | * 3/2000 |
| JP | 2001-338661 | * 12/2001 |

* cited by examiner

Primary Examiner—Randy Gulakowski
Assistant Examiner—Jonathan Crepeau
(74) Attorney, Agent, or Firm—Alston & Bird LLP (57) ABSTRACT

A fuel is supplied to a reformer provided with a hydrogen-permeable separation membrane for selectively allowing hydrogen to pass through to generate hydrogen. The generated hydrogen is supplied to a fuel cell, and a drive unit is operated by electric power obtained by the fuel cell to run a vehicle.

5 Claims, 7 Drawing Sheets

METHOD FOR DRIVING A FUEL CELL VEHICLE AND FUEL CELL VEHICLE

BACKGROUND OF THE INVENTION

FIELD OF THE INVENTION

The present invention relates to a method for driving a fuel cell vehicle and a fuel cell vehicle.

At present, a fuel cell vehicle has been developed actively. A fuel cell vehicle uses a principle that hydrogen is produced from a fuel by means of a reformer, the obtained hydrogen is supplied to a fuel cell to provide electricity, and a motor is rotated by the obtained electricity. This principle can be applied to not only an automobile running with four wheels but also all types of vehicles such as a motorcycle and a railway train running on rails.

The use of a system which uses a fuel cell to operate a drive unit can provide a vehicle in which the energy efficiency is high, the emission of $CO_2$, which poses a problem of global environment, is less, and $NO_x$ is scarcely emitted.

SUMMARY OF THE INVENTION

The hydrogen supplied to the fuel cell preferably has higher purity. For example, if Co-containing hydrogen is supplied, the life of the fuel cell decreases significantly. Also, an ingredient other than hydrogen does not contribute to the performance of fuel cell, and the presence of the ingredient introduces the need to make the fuel cell large.

Also, because the fuel cell must be carried on a vehicle and the performance and function of vehicle must be enhanced, the fuel cell is desired to be smaller in size. From this viewpoint, it is necessary to obtain purer hydrogen with high efficiency and to supply it to the fuel cell.

The present invention has been made in view of the above situation, and accordingly an object thereof is to provide a method for driving a fuel cell vehicle and a fuel cell vehicle, in which hydrogen obtained from a fuel can be recovered efficiently with high purity and can be supplied to a fuel cell.

To achieve the above object, the present invention provides a method for driving a fuel cell vehicle, comprising the steps of supplying a fuel to a reformer provided with a hydrogen-permeable separation membrane for selectively allowing hydrogen to pass through to generate hydrogen, supplying the generated hydrogen to a fuel cell, and operating a drive unit by electric power obtained by the fuel cell to run a vehicle.

The reformer provided with a hydrogen-permeable separation membrane can be a membrane reformer.

Also, the hydrogen generated by the reformer can be once stored in a hydrogen absorbing alloy, and the hydrogen can be supplied from the hydrogen absorbing alloy to the fuel cell.

Further, a plurality of hydrogen storage apparatuses incorporating a hydrogen absorbing alloy can be provided so that when some of the hydrogen storage apparatuses absorb hydrogen supplied from the reformer, the other hydrogen storage apparatuses discharge hydrogen and supply it to the fuel cell.

Another aspect of the present invention is a fuel cell vehicle, which comprises a fuel tank; a reformer provided with a hydrogen-permeable separation membrane, for generating hydrogen from a fuel supplied from the fuel tank; a fuel cell supplied with the hydrogen, for obtaining electric power; and a drive unit operated by the electric power.

The reformer provided with a hydrogen-permeable separation membrane can be a membrane reformer.

Also, the reformer provided with a hydrogen-permeable separation membrane can generate hydrogen by CO shift reaction after partial oxidation of the fuel, and hydrogen can be obtained selectively by the hydrogen-permeable separation membrane.

Also, the reformer provided with a hydrogen-permeable separation membrane can generate hydrogen by CO shift reaction after reforming reaction of the fuel carried out by water vapor, and hydrogen can be obtained selectively by the hydrogen-permeable separation membrane.

Further, a hydrogen storage apparatus can be provided which incorporates a hydrogen absorbing alloy for once storing hydrogen from the reformer provided with a hydrogen-permeable separation membrane before the hydrogen is supplied to the fuel cell.

The fuel can be any one or a mixture of two or more of CNG, ethane, propane, butane, gasoline, naphtha, dimetyle ether, and methanol.

As is apparent from the above description, according to the present invention, there are provided a method for driving a fuel cell vehicle and a fuel cell vehicle, in which hydrogen obtained from a fuel can be recovered efficiently with high purity and hydrogen suitable for a fuel cell can be supplied.

Also, when a membrane reformer is used as a reformer, the reaction temperature in reforming fuel can be decreased. Further, the fuel cell automobile in accordance with the present invention can be provided with a hydrogen storage apparatus incorporating a hydrogen absorbing alloy, and the hydrogen outlet of the membrane reformer or a hydrogen-permeable separation membrane can be connected to the hydrogen storage apparatus. Thereby, the partial pressure of hydrogen on the recovery side is decreased, and hydrogen can be withdrawn rapidly from the membrane reformer. Further, since the hydrogen stored in the hydrogen storage apparatus can be used at the time of operation start of automobile, an effect that the running of automobile can be started simultaneously with the operation start can be anticipated. When a plurality of hydrogen storage apparatuses are arranged in parallel, as described above, reduced cost and enhanced equipment performance can further be achieved.

Still further, when compressed natural gas, which is called CNG, propane gas, butane gas, or dimethyl ether is used as a fuel, an infrastructure for supplying these gases has already been built and the tank capacity can be decreased because of high calorific value of these gases.

BRIEF DESCRIPTION OF THE DRAWING

Embodiments in accordance with the present invention will be described below with reference to the accompanying drawings.

DETAILED DESCRIPTION OF THE PREFERRED EMBODIMENT

Figure 1:
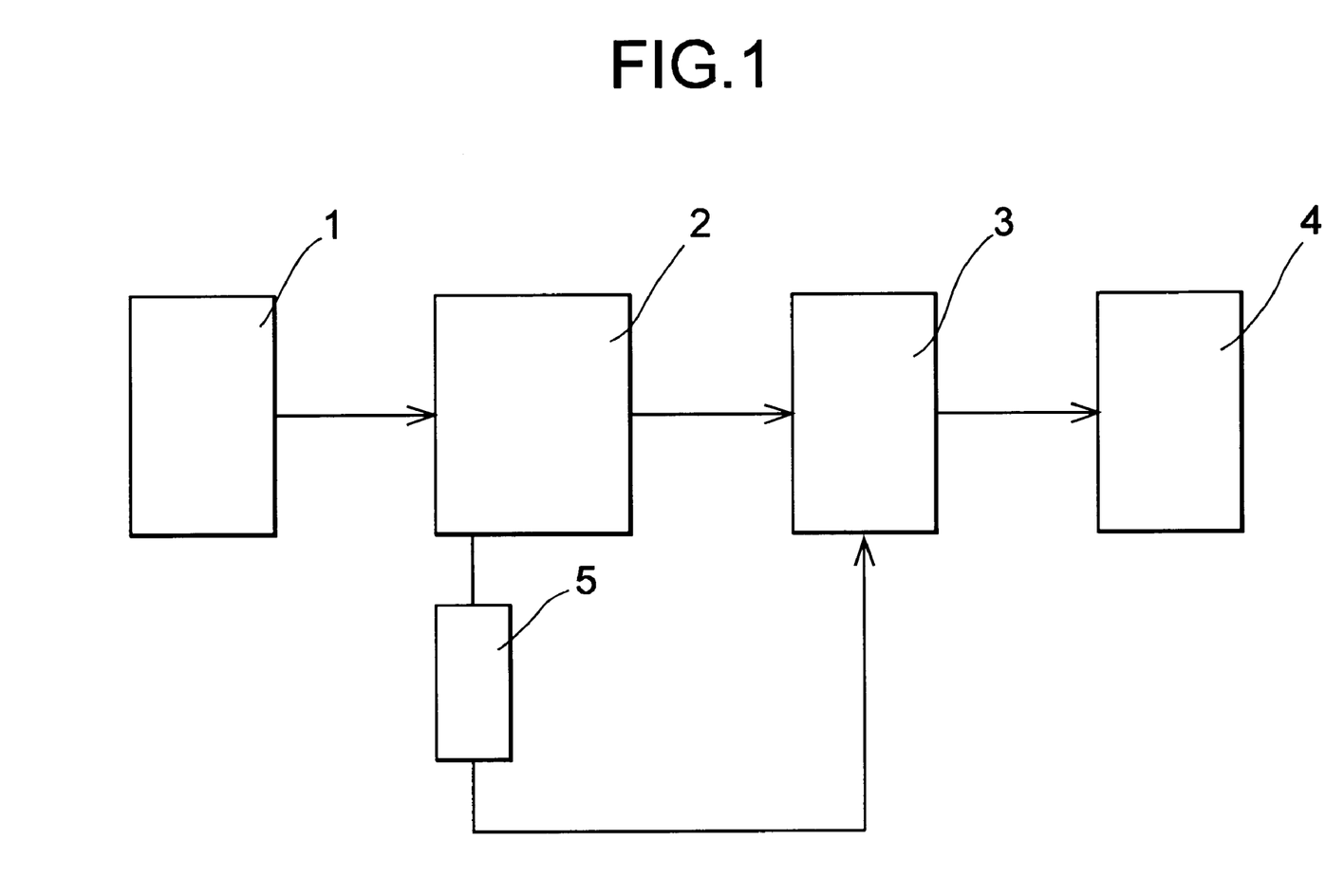
FIG. 1 is a schematic diagram for illustrating one embodiment of a fuel cell automobile in accordance with the present invention.

FIG. 1 schematically illustrates a system of an embodiment for a fuel cell automobile in accordance with the present invention.

Figure 2:
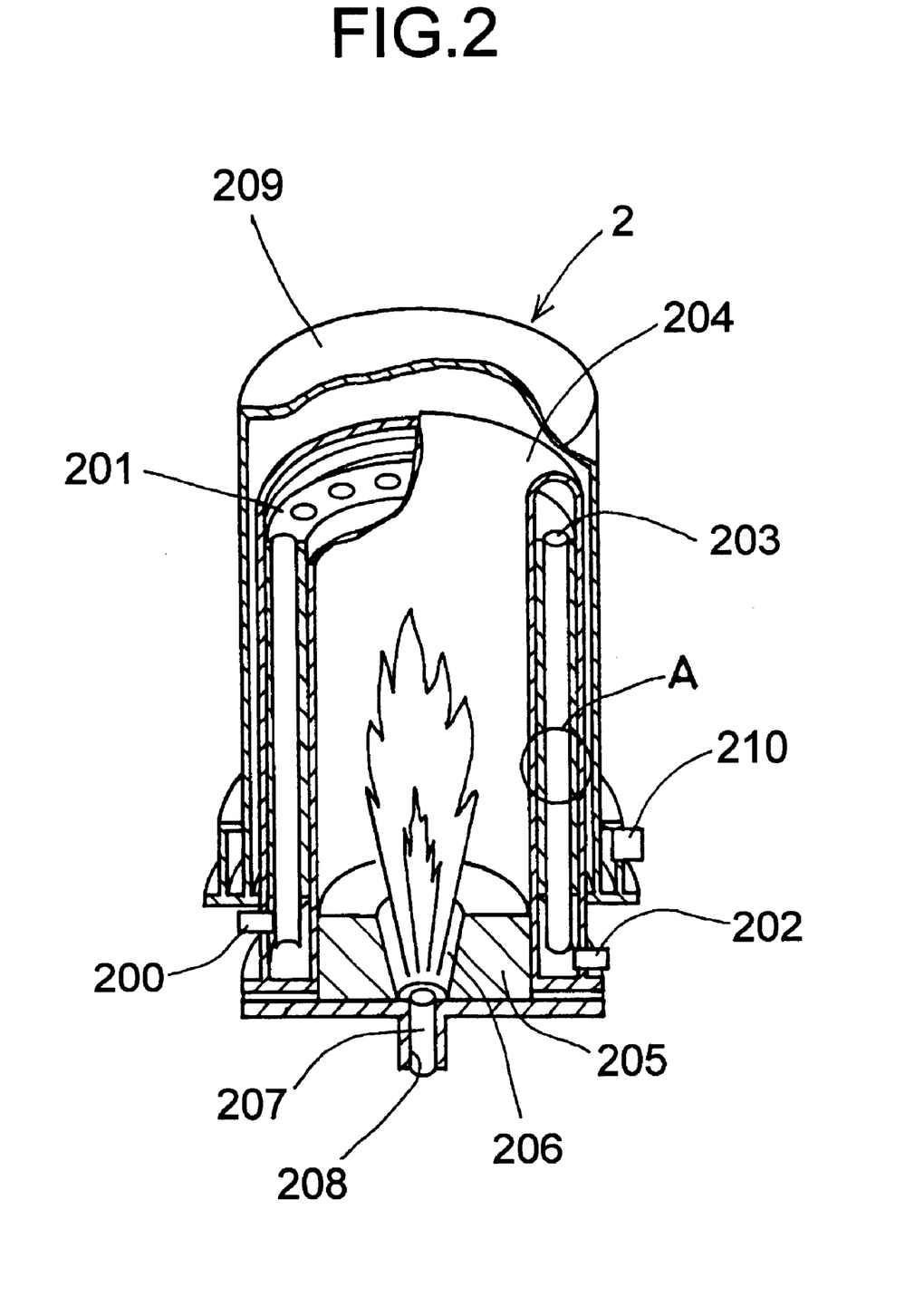
FIG. 2 is a partially cutaway view in perspective of a membrane reformer used in the embodiment shown in FIG. 1 of a fuel cell automobile in accordance with the present invention.
Figure 3:
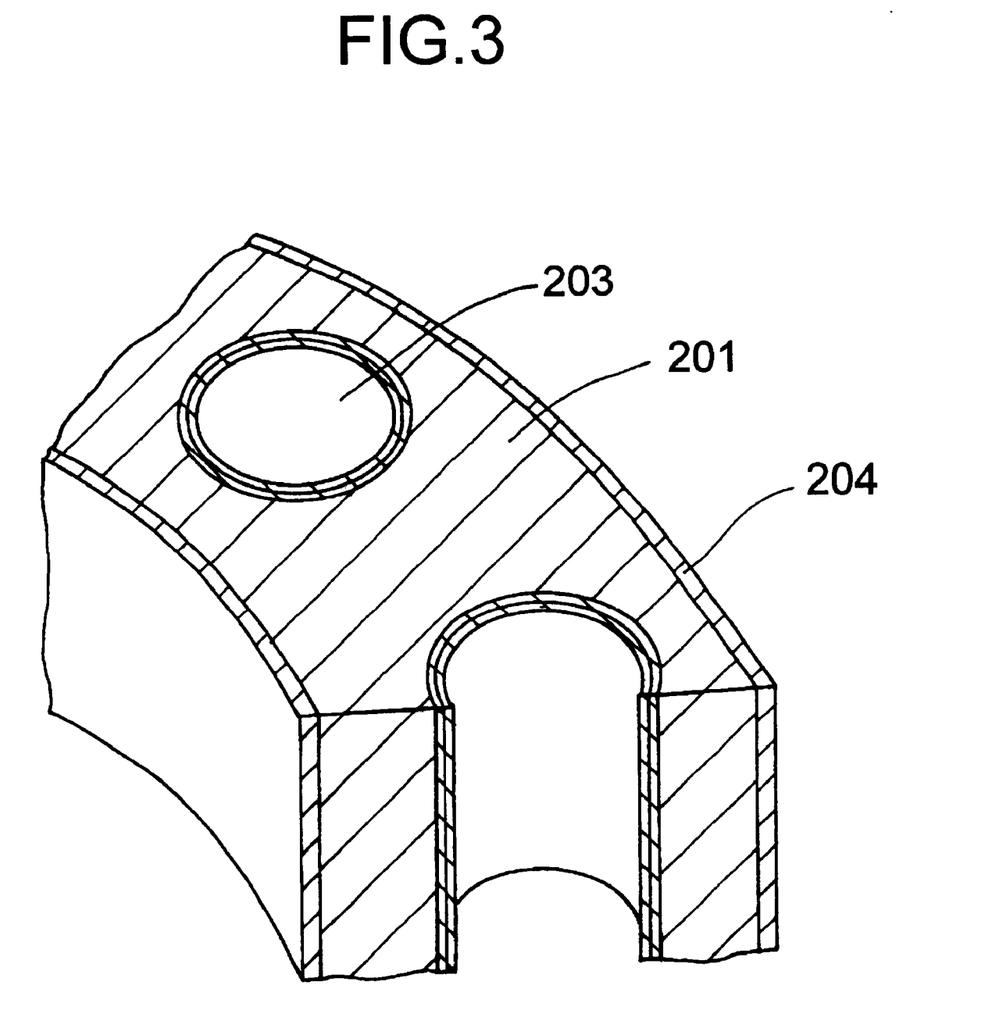
FIG. 3 is an enlarged view of portion A of FIG. 2.

As shown in this schematic diagram, the fuel cell automobile is provided with a fuel tank 1, a reformer 2 for producing hydrogen from a fuel supplied from the fuel tank 1, a fuel cell 3 supplied with the hydrogen to generate electric power, and a wheel driving motor (drive unit) 4 which is rotated by the electric power obtained by the fuel cell 3. The fuel cell 3 is of a polymer electrolyte type (PEFC). The fuel cell used in the present invention is generally a cell which is continuously supplied with a cell activating substance (fuel) from the outside and removes discharge products successively to the outside of the system to carry out burning reaction electrochemically for direct conversion into electrical energy. Conventionally, a fuel cell of a phosphoric acid type (PAFC), a molten carbonate type (MCFC), a solid oxide type (SOFC), or a polymer electrolyte type (PEFC) has been used. Of these, the polymer electrolyte type is best suitable in the present invention. The reformer 2 is a membrane reformer as shown in FIGS. 2 and 3. Of various types of reformers, the membrane reformer is best suitable in carrying out the present invention, as described later, because it can keep the reaction temperature in reforming fuel low. Although omitted in FIG. 1, the fuel cell automobile in accordance with the present invention is provided with various parts including other control units necessary for running.

As shown in FIGS. 2 and 3, in this membrane reformer (hydrogen production apparatus) 2, a mixed gas of fuel and water vapor is introduced through a feedstock supply port 200. The introduced mixed gas is reformed by a reforming catalyst layer 201 to generate a gas containing hydrogen gas. The hydrogen gas in the generated gas passes through hydrogen permeation tubes (membrane tubes) 203, and flows out through a hydrogen outlet 202. The gas ($CO_2$, CO, $H_2O$, unreacted fuel) having not passed through the hydrogen permeation tubes 203 goes out of an off gas outlet (not shown) and is recycled or discharged. The reforming catalyst layer 201 and the hydrogen permeation tubes 203 are contained in an inside cylinder 204.

On the other hand, this membrane reformer 2 has a combustion burner 206 provided at the center of the burner tile 205. The combustion burner 206 burns a fuel gas introduced through a fuel gas tube 207 by using air introduced through an air intake tube 208. Thereby, thermal energy necessary for water vapor reforming reaction is supplied to the reforming catalyst layer 201 to keep the reforming catalyst layer 201 at a predetermined temperature. The inside cylinder 204 is covered by a casing 209. The exhaust gas is discharged through an exhaust gas outlet 210.

In this embodiment, as the fuel, natural gas, naphtha, light hydrocarbon (including methane, ethane, propane, and butane), and oxygen-containing hydrocarbon represented by alcohol such as dimethyl ether and methanol can be used. Further, gasoline containing no sulfur can also be used. However, compressed natural gas, which is called CNG, propane gas, and butane gas are best suitable for the present invention because an infrastructure for supplying these gases has already been built and these gases have a high calorific value, so that the tank capacity can be decreased.

The reforming catalyst used in this embodiment may be any catalyst that has conventionally been used when hydrogen is produced from the aforementioned feedstock gas by the water vapor reforming process.

The hydrogen permeation tube 203 is composed of a hydrogen-permeable metallic membrane that allows only the produced hydrogen to pass through and supplies it to the fuel cell. Since the hydrogen-permeable metallic membrane allows only hydrogen to pass through selectively, the separated hydrogen has a very high purity not lower than 99.999%, so that it is best suitable as hydrogen for a polymer electrolyte fuel cell.

In addition, the yielded hydrogen is immediately separated selectively from the product according to reaction by the hydrogen permeation tube 203 to decrease the partial pressure of hydrogen in the product. Therefore, the reaction proceeds to the side on which hydrogen increases, with the result that the degree of conversion at the same reaction temperature increases. In other words, although the conventional methane reforming process requires a temperature of about 800° C. in the reaction zone, the membrane reformer 2 of this embodiment can achieve the same degree of conversion at a temperature of 500 to 600° C. by the use of the hydrogen permeation tube 203. Thus, the hydrogen permeation tube 203 allows hydrogen to pass through and thereby the chemical reaction can be shifted to the side on which hydrogen increases, so that the reforming temperature decreases by about 200 to 300° C. Therefore, the quantity of heat for heating the reaction gas is saved, so that the thermal efficiency increases significantly. Also, since the reaction temperature is low, an inexpensive material with low heat resistance can be used for the equipment, and therefore the cost of equipment can be reduced. For these reasons, this embodiment is especially suitable for a fuel cell automobile.

The hydrogen-permeable metallic membrane with a thickness of 5 to 50 $\mu$m is formed on an inorganic porous layer to selectively allow hydrogen to pass through. The inorganic porous layer under the metallic membrane is a carrier for holding the hydrogen-permeable metallic membrane, and is formed of porous stainless steel nonwoven fabric, ceramics, glass, or the like with a thickness in the range of 0.1 mm to 1 mm. Further, a wire mesh consisting of a single layer or a plurality of layers is preferably arranged on the inside of the inorganic porous layer as a structure reinforcing member.

Preferably, the hydrogen-permeable metallic membrane should be a non-porous layer of any of an alloy containing Pd, an alloy containing Ni, and an alloy containing V. As the alloy containing Pd, Pd—Ag alloy, Pd—Y alloy, Pd—Ag—Au alloy, etc. can be enumerated. As the alloy containing V, V—Ni alloy, V—Ni—Co alloy, etc. can be enumerated. Also, as the alloy containing Ni, $LaNi_5$ etc. can be enumerated. Also, a method for producing a non-porous Pd layer has been disclosed in U.S. Pat. No. 3,155,467, for example.

The fuel cell automobile in accordance with this embodiment may further be provided with a hydrogen storage apparatus 5 incorporating a hydrogen absorbing alloy as shown in FIG. 1. In this case, the hydrogen outlet of the membrane reformer 2 can be connected to the hydrogen storage apparatus 5. Thereby, the partial pressure of hydrogen on the recovery side of the membrane reformer 2 is decreased, by which hydrogen can be withdrawn rapidly from the membrane reformer 2. Also, the hydrogen stored in the hydrogen storage apparatus 5 can be supplied to the fuel cell 3 at the time of operation start of automobile. Therefore, an effect that the running of automobile can be started simultaneously with the operation start can be anticipated.

The hydrogen absorbing alloy can store a large amount of hydrogen, and the hydrogen can be discharged by heating or depressurization, and can be absorbed by cooling or pressurization. Also, the discharge and absorption thereof is reversible.

Figure 4:
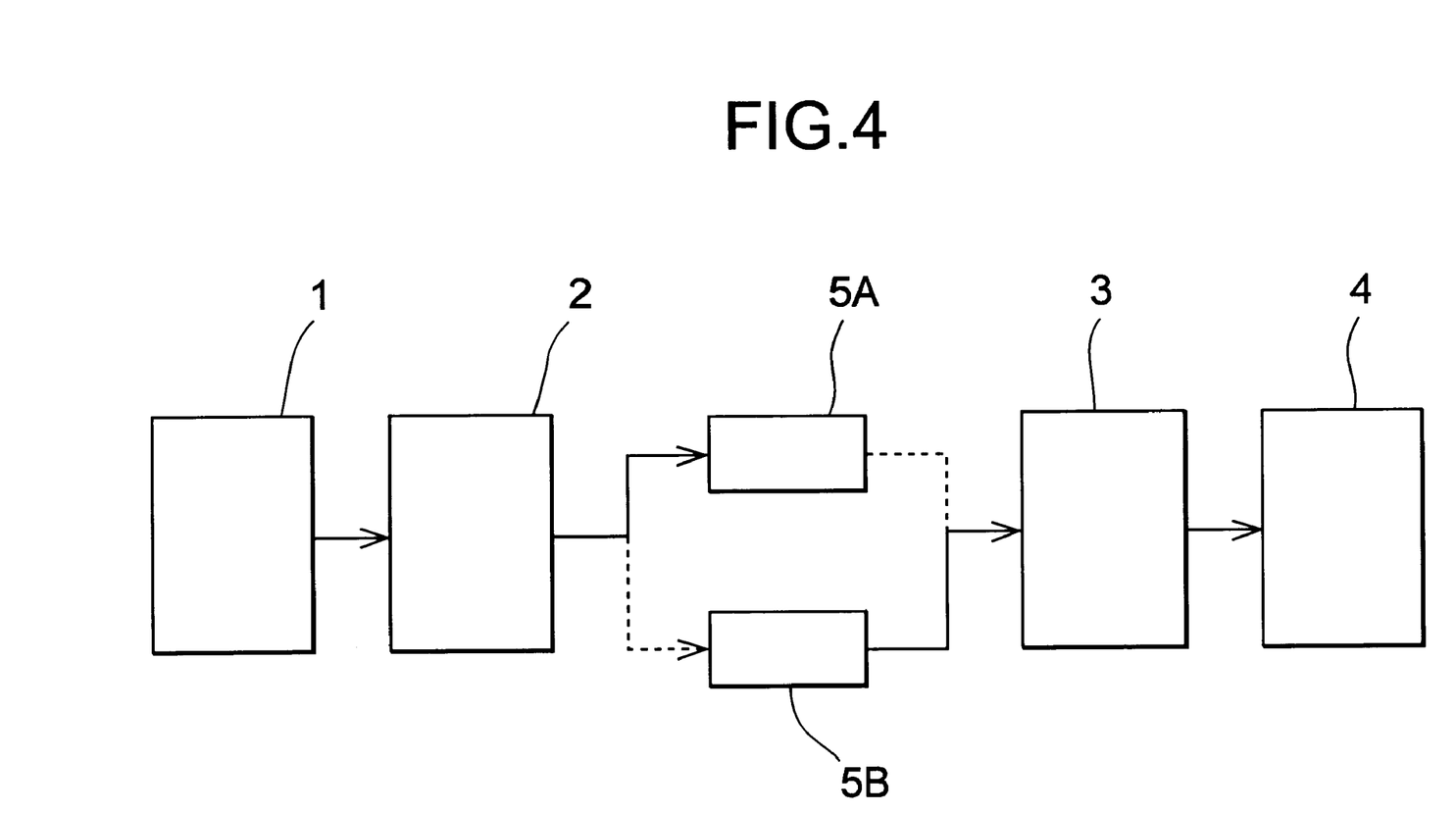
FIG. 4 is a schematic diagram for illustrating another embodiment in which a plurality of hydrogen storage apparatuses are provided.
Figure 5:
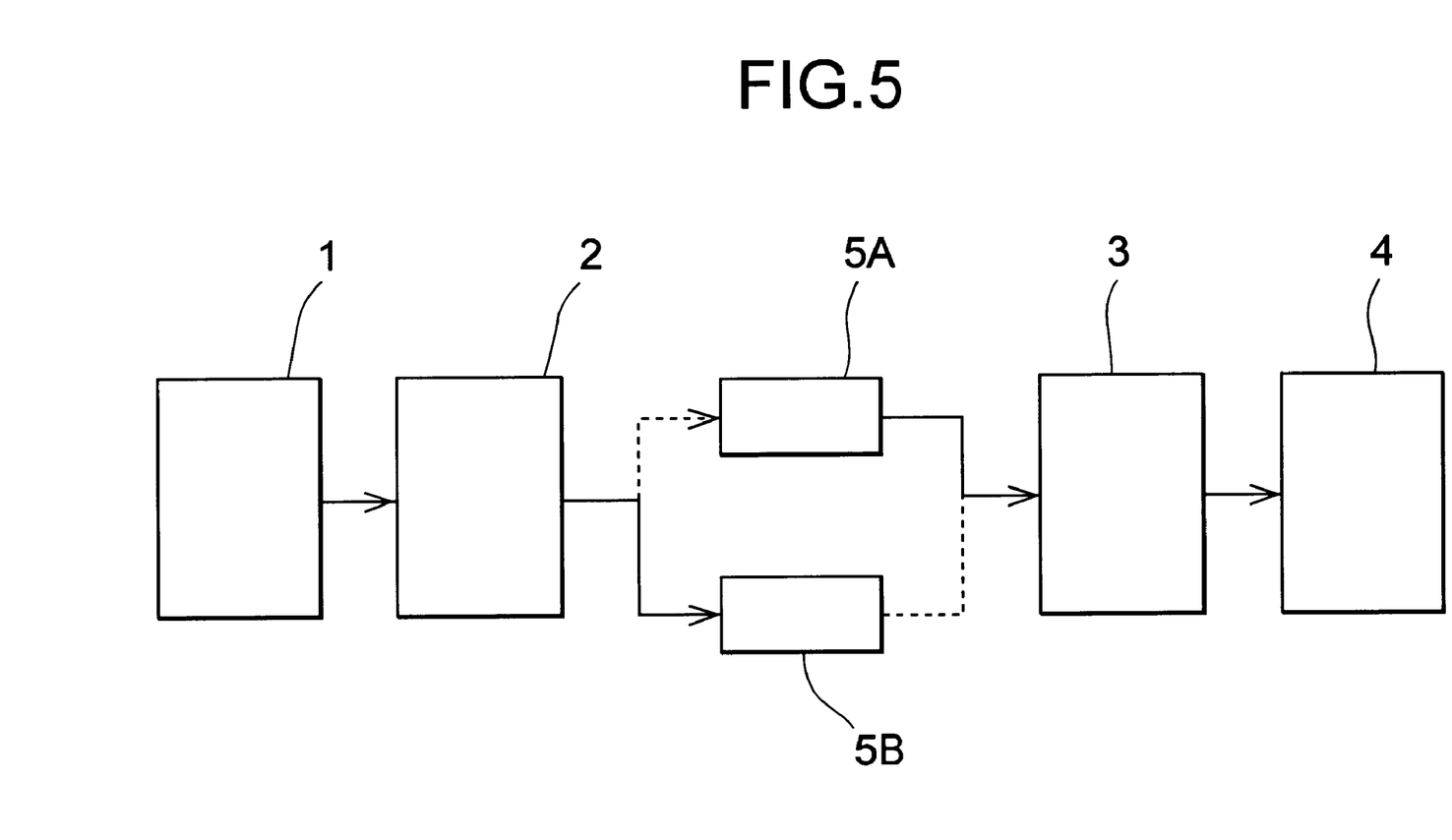
FIG. 5 is a schematic diagram for illustrating another embodiment in which a plurality of hydrogen storage apparatuses are provided.

FIGS. 4 and 5 show an embodiment in which two hydrogen storage apparatuses 5 are arranged in parallel. In this embodiment, unlike the embodiment shown in FIG. 1, either of the hydrogen storage apparatuses 5A and 5B is always connected with the membrane reformer 2. The elements to which the same reference numeral as that in FIG. 1 is applied perform the same function as that described with reference to FIG. 1.

In FIG. 4, the membrane reformer 2 and the hydrogen storage apparatus 5A are connected to each other, and the hydrogen storage apparatus 5B is connected to the fuel cell 3. In this state, the hydrogen storage apparatus 5A is cooled to 20 to 40° C., and the hydrogen storage apparatus 5B is heated to 50 to 100° C. Then, the hydrogen storage apparatus 5A stores hydrogen, while the hydrogen storage apparatus 5B discharges hydrogen and supplies it to the fuel cell 3.

In FIG. 5, the membrane reformer 2 and the hydrogen storage apparatus 5B are connected to each other, and the hydrogen storage apparatus 5A is connected to the fuel cell 3. In this state, the hydrogen storage apparatus 5B is cooled to 20 to 40° C., and the hydrogen storage apparatus 5A is heated to 50 to 100° C. Then, the hydrogen storage apparatus 5B stores hydrogen, while the hydrogen storage apparatus 5A discharges hydrogen and supplies it to the fuel cell 3.

In this embodiment, the hydrogen storage apparatuses 5A and 5B are operated by switching using a controller (not shown). Thereby, hydrogen is always withdrawn from the membrane reformer 2 by the hydrogen absorbing alloy. As a result, the membrane area of the metallic membrane of the membrane reformer 2 can be decreased, and therefore the cost can be reduced. Also, the pressure of hydrogen supplied to the fuel cell 3 can be increased, so that the performance of the fuel cell 3 can be enhanced. Needless to say, like the embodiment shown in FIG. 1, the stored hydrogen can be used at the start time. Further, since the load change of the reformer itself decreases, the durability increases.

Although the above is a description of the case where two hydrogen storage apparatuses are provided, it is a matter of course that three or more hydrogen storage apparatuses are provided, and are operated in conjunction with each other by a controller.

Figure 6:
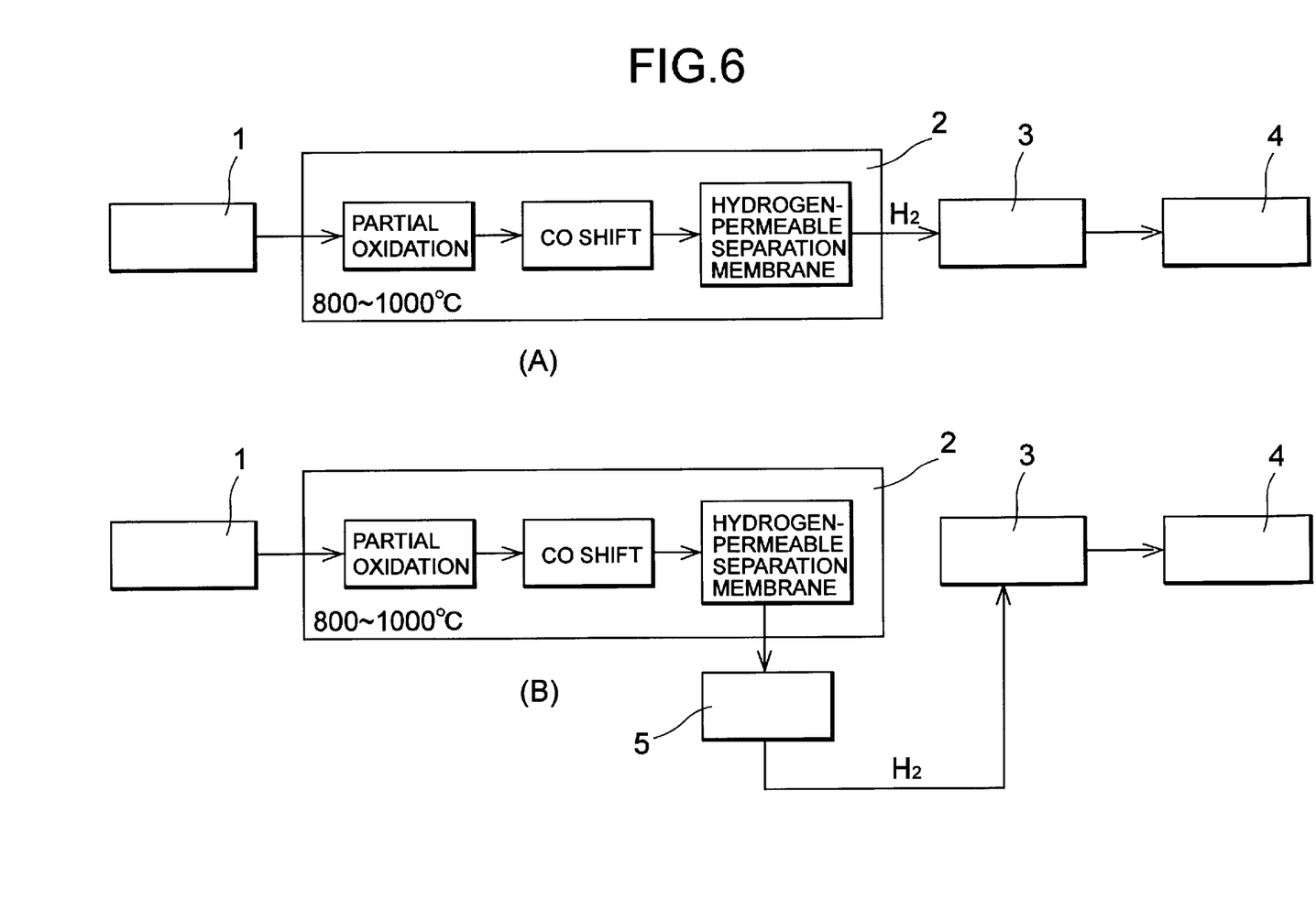
FIG. 6 is a schematic diagram for illustrating an embodiment in which another reformer is provided.
Figure 7:
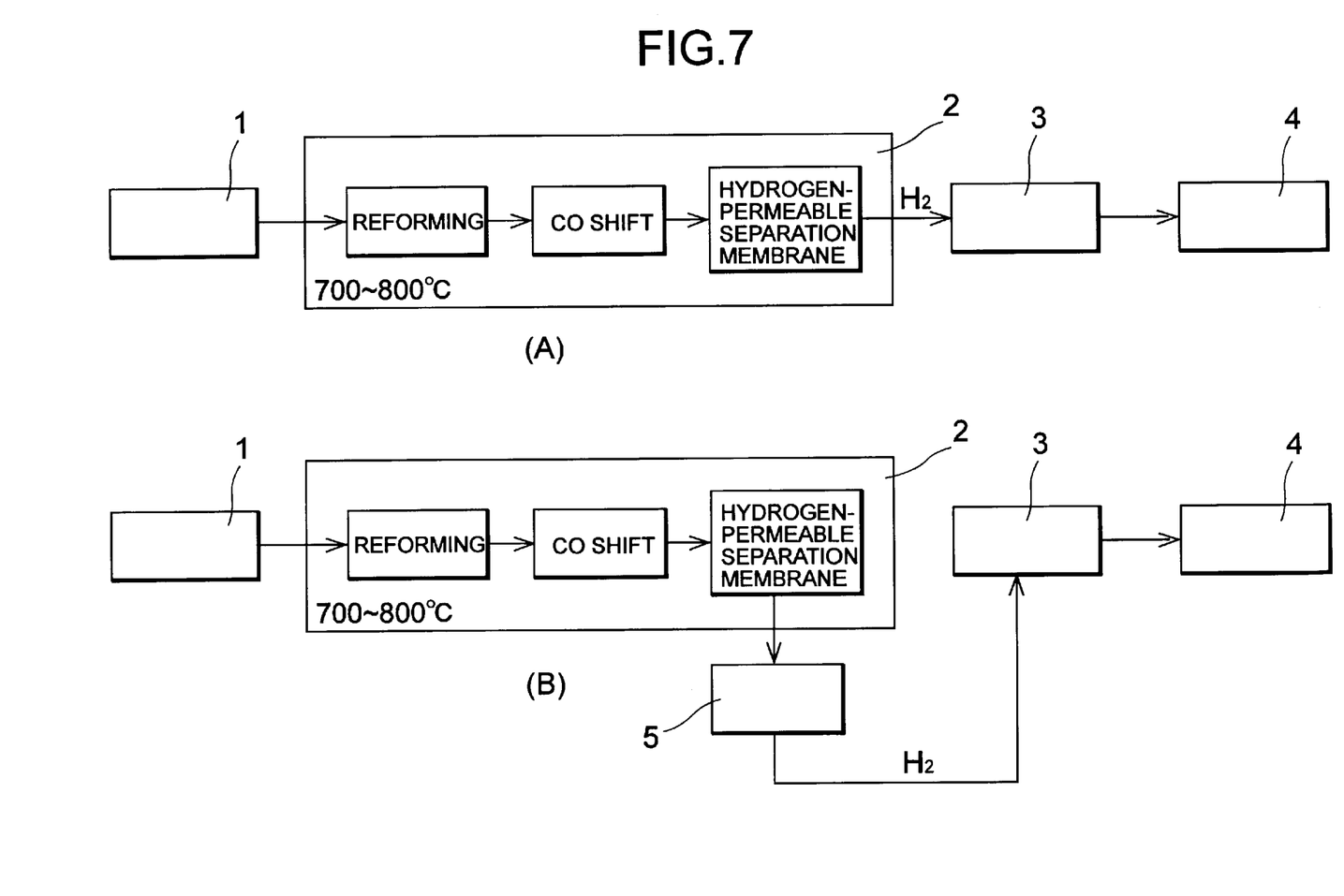
FIG. 7 is a schematic diagram for illustrating an embodiment in which still another reformer is provided.

Next, another embodiment in which another type of the reformer 2 is used is shown in FIGS. 6 and 7.

FIG. 6(A) shows an example of a mode in which hydrogen is generated by CO shift reaction after partial oxidation (800 to 1000° C.) of fuel, and high purity hydrogen is obtained by a hydrogen-permeable separation membrane. FIG. 7(A) shows an example of a mode in which hydrogen is generated by CO shift reaction after reforming reaction (700 to 800° C.) of fuel carried out by water vapor, and high purity hydrogen is obtained by a hydrogen-permeable separation membrane.

In the embodiments shown in FIGS. 6(A) and 7(A), the elements to which the same reference numeral as that in FIG. 1 is applied perform the same function as that described with reference to FIG. 1, except that the mode of the reformer 2 is different.

In these embodiments, the reaction temperature is high and the equipment becomes large as compared with the embodiments shown in FIGS. 1 to 3, in which the membrane reformer is used. However, by a combination with the hydrogen-permeable separation membrane, high purity hydrogen suitable for the fuel cell can be obtained from the gas containing the generated hydrogen.

On the other hand, FIGS. 6(B) and 7(B) show a configuration in which the hydrogen storage apparatus is provided behind the reformer. For the hydrogen storage apparatus 5, a plurality of hydrogen storage apparatuses can be arranged in parallel as described above with reference to FIGS. 4 and 5, and the plurality of hydrogen storage apparatuses can be operated by switching using a controller. In the embodiments shown in FIGS. 6(B) and 7(B), the elements to which the same reference numeral as that in FIG. 1 is applied perform substantially the same function as that described with reference to FIG. 1, except that the mode of the reformer 2 is different.

The present invention is not limited to the above-described embodiment but can be subjected to various modifications within a range of the technical idea of the present invention.

For example, the reformer is not limited to the aforementioned membrane reformer, and may be of other types. In effect, a type in which a hydrogen-permeable metallic membrane is arranged adjacently to a reforming catalyst layer and only hydrogen pass through the metallic membrane can be used unless it departs from the object of the present invention.

Further, in the embodiment shown in FIG. 1, a path which is used by switching a plurality of hydrogen storage apparatuses as in the case of the embodiment shown in FIGS. 4 and 5 and a path which sends hydrogen directly to the fuel cell can be arranged in parallel. Thereby, a state in which hydrogen is sent directly to the fuel cell and a state in which any hydrogen storage apparatus is always used can be switched. Similarly, in the embodiments shown in FIGS. 6(B) and 7(B), a mode in which a path for directly sending hydrogen to the fuel cell is arranged in parallel can be used.

The disclosure of Japanese Patent Application No.11-185191 filed on Jun. 30, 1999 including specification, claims, drawings, and summary are incorporated herein by reference with its entirety.

What is claimed is:

1. A method for driving a fuel cell vehicle, comprising the steps of supplying a fuel to a reformer provided with at least one hydrogen permeation tube for selectively allowing hydrogen from the fuel to pass through the tube wall to a fuel cell as hydrogen is generated, and operating a drive unit by electric power obtained by the fuel cell to run a vehicle, wherein a plurality of hydrogen storage apparatuses incorporating a hydrogen absorbing alloy are provided and each of said hydrogen storage apparatuses are in communication with said reformer and with said fuel cell so that when some of the hydrogen storage apparatuses absorb hydrogen supplied from the reformer, the other hydrogen storage apparatuses discharge hydrogen and supply it to the fuel cell.

2. The method for driving a fuel cell vehicle according to claim 1, wherein the reformer provided with a hydrogen-permeable separation membrane is a membrane reformer.

3. A fuel cell vehicle comprising a fuel tank; a reformer provided with at least one hydrogen permeation tube, for generating hydrogen from a fuel supplied from the fuel tank and for separating hydrogen from the fuel as the hydrogen is generated; a fuel cell supplied with the hydrogen, for obtaining electric power; a plurality of hydrogen storage apparatuses incorporating a hydrogen absorbing alloy, each of said hydrogen storage apparatuses in communication with said reformer and with said fuel cell so that when some of the hydrogen storage apparatuses absorb hydrogen supplied from the reformer, the other hydrogen storage apparatuses discharge hydrogen and supply it to the fuel cell; and a drive unit operated by the electric power from the fuel cell.

4. The fuel cell vehicle according to claim 3, wherein the reformer provided with a hydrogen-permeable separation membrane is a membrane reformer.

5. The fuel cell vehicle according to claim 3, wherein the fuel is any one or a mixture of two or more of CNG, ethane, propane, butane gasoline, naphtha, dimethyl ether, and methanol.

\* \* \* \* \*